Feb. 8, 1955  R. FENNEMA  2,701,705
MOUNTING FOR VALVE ACTUATING MEANS
Filed Dec. 23, 1949

Inventor.
Richard Fennema.
By Joseph O. Lange
Atty.

2,701,705

MOUNTING FOR VALVE ACTUATING MEANS

Richard Fennema, Chicago, Ill., assignor to Crane Co., Chicago, Ill., a corporation Application December 23, 1949, Serial No. 134,749

4 Claims. (Cl. 251—367)

This invention relates to a novel mounting for a valve actuating means or the like, and, more particularly, it is concerned with the type of valve structure of the general types shown on pages 132 and 224 of Crane Co.'s No. 49 catalog, in which a bolted bonnet may be used, with either the bonnet, centerpiece or yoke being of the integral, cast or fabricated structure with a wide variety of methods of attachment.

Obviously, it will be apparent that such structures in which the yoke and the bonnet are integral, whether fabricated or cast, involve the objection that the valve yoke cannot be freely or easily rotated for purpose of convenience in the final installation, except as permitted by the increments of angularity established by the connection itself. However, such limited rotatability, even if satisfactory, is further objectionable because it is necessary to loosen the bonnet or yoke relative to the body if a change or rotational adjustment is desired, as, for example, in the location of the superposed gear or motor actuating units involved.

Thus, it is an important object of the instant invention to provide a structure in which the valve yoke may be rotated in a large and varied angular range without disturbing the bonnet joint per se.

Another important object is to provide for an easily adjustable and rotatable valve yoke, in which suitable clamps for attaching the yoke to the bonnet will carry the complete load imposed on the yoke and in which the bolts are therefore employed merely for the purpose of holding the clamps in position. Thus, the relative stress on the bolts is very low.

In contradistinction, previous structures involving a conventional bolted bonnet provided for stresses on the bonnet of a high degree, sometimes resulting in failure of the bolting, particularly where vibration or other substantial strain was present in the pipe line.

Figure 1:
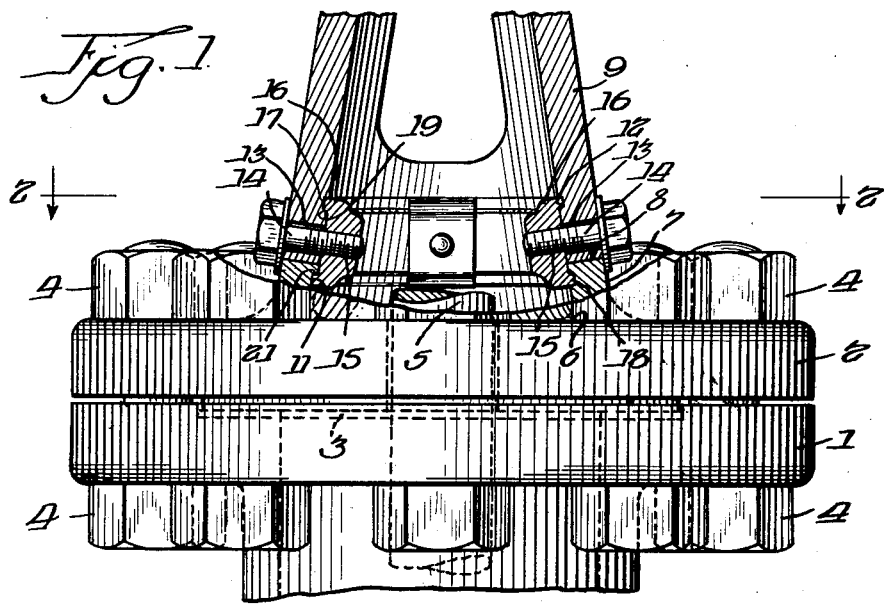

Other objects and advantages will become more readily apparent upon proceeding with the following description read in light of the accompanying drawings, in which Fig. 1 is a fragmentary sectional assembly view of a valve embodying my invention.

Figure 2:
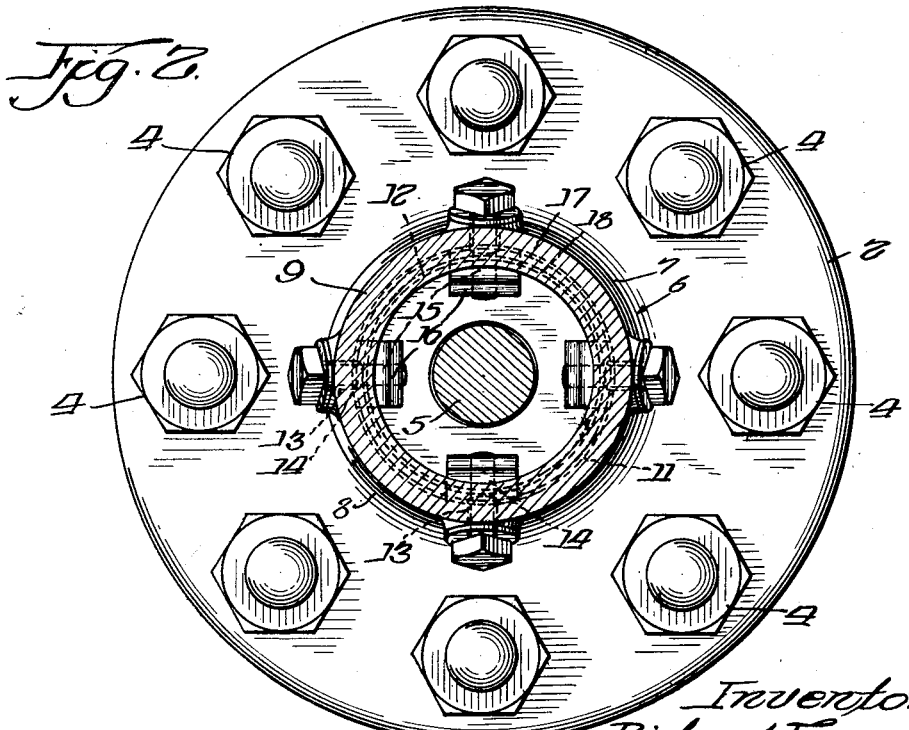

Fig. 2 is a sectional assembly view taken on the line 2—2 of Fig. 1.

Similar reference numerals refer to similar parts throughout the several views.

Referring now to Fig. 1, the upper portion of a conventional bolted valve body 1 is shown, applicable either to a gate or a globe valve, and having attached thereto in the usual manner a body closure, such as a valve bonnet 2. Between the body and bonnet is positioned a sealing gasket 3 maintained in leakproof relation thereto by means of the bolts 4, the number and size of the bolts varying in accordance with the size of the valve structure. At the lower portion of the valve (not shown) is the usual disc member (also not shown) connected by any suitable means to a valve stem fragmentarily indicated at 5. The stem 5 is usually mounted in connection with a stuffing box and packing arrangement, which here, however, for purpose of clarity in connection with this application, has been omitted. On its upper surface, as at 6, the valve bonnet is provided with a frusto-conical base member 7 which may be cast integrally with the bonnet member 2 or else it may be welded, brazed, or otherwise attached firmly to the said bonnet. The upper limits of the annular base member 7 are defined by the annularly extending inwardly pitched surface 8 upon which is supported the yoke 9 in substantially abutting relation to the annular surface 8. The annular projecting portion of the base member 7 also is provided with an inner annularly extending groove 11 for purposes hereinafter referred to at greater length. Similarly, the yoke member 9, at its lower end portion adjacent the abutting contact with the annular surface 8 is provided with an inner annular groove 12. As indicated, below the latter mentioned groove, the yoke member 9 is drilled or otherwise apertured at 13 to receive the bolt 14, threaded at 15, to engage a clamp 16. It will be noted that the clamp 16 is specially provided with the upper and lower transversely extending tongues 17 and 18 respectively to engage the grooves 12 and 11 of the yoke and bonnet members, as shown. Preferably, the respective grooves 11 and 12 are made with each one of the transverse annular surfaces bevelled or inclined, as shown at 19 and 21, thereby to create additional force in drawing the members 9 and 7 together.

The clamps 16 thus carry the tensile load of the actuating mechanism when the valve is being closed and the bolts 14 are relieved of such stresses and strains as would normally cause failure. It will be apparent that a relatively simple, economical, and effective bonnet construction has been provided, whereby the yoke is easily rotatable to suit the varied installation requirements, especially in the cases of motor-operated valves and the like where special gear pads on the yoke might otherwise be necessary. The yoke is easily revolvable and the bonnet joint and gasket, as at 3, remain undisturbed during such adjustment of the yoke positioning. Obviously, this is of considerable importance since a disturbed gasket joint might easily lead to costly leakage between the valve body and bonnet.

While only a single embodiment has been shown, it will, of course, be understood that the manner of attachment of the yoke and the bonnet may be varied substantially from the detailed structure shown and described, and, therefore, the measure of this invention should be considered in light of the appended claims.

I claim:

1. In a valve bonnet support for an actuating mechanism of the character described, the combination of a bonnet and a superposed yoke mounted in annular end abutting relation to the said bonnet, apertures formed entirely in one of the said latter members, the said bonnet having annularly arranged raised means thereon for supporting an annular end of the said yoke to carry the latter member in said abutting relation to the bonnet, clamp means extending substantially in a vertical plane and having spaced apart projecting ends for engaging respectively an end portion of the said yoke adjacent the said abutting contact and an upper end portion of the said annular raised means of the bonnet, the said bonnet and yoke end portions having inner annular recessed portions thereon for engaging the spaced apart projecting ends of the said clamp means to hold said yoke against transverse movement relative to the bonnet raised means, bolt retaining means received within the said apertures to maintain said clamp means fixedly relative to the said bonnet and yoke members upon effecting said engagement of the said clamp means with the said bonnet and yoke members.

2. In a valve bonnet supporting structure for an actuating mechanism or the like, the combination of a bonnet and a yoke, apertures formed entirely in one of the said latter members, the bonnet having on an upper surface thereof annularly arranged raised means forming a relatively low wall thereon, oppositely disposed inner wall portions on said bonnet and yoke members, the said relatively low wall contacting a lower end surface portion of the said yoke in abutting relation to support the said yoke thereon, clamp means therebetween positioned in annular spaced apart relation for engaging said inner wall portions of the bonnet and yoke members, the said bonnet and yoke having annular recessed portions cooperating with inwardly projecting limits of said clamp means to hold the bonnet and yoke members together in superposed position, and bolt means cooperating with the clamp means and receivable within the said apertures to retain the bonnet and yoke members in said position.

3. In a demountable supporting means for a valve actuating mechanism, the combination of a bonnet and a yoke supported by the bonnet, apertures formed entirely in one of the said latter members, the said bonnet having annularly arranged wall means for receiving the said yoke in end abutting relation, clamp means therebetween, the said clamp means comprising spaced apart annularly positioned apertured clamp members with inturned portions formed on opposite ends of the clamp members simultaneously engaging the said bonnet and yoke, each of the said bonnet and yoke members having annular relieved portions for receiving the inturned portions of the said clamp members to hold the bonnet and yoke members in assembled relation, and removable bolt means receivable within said apertures and engaging the said clamp members for maintaining said latter members in fixed engagement with the said bonnet and yoke.

4. In a combined valve bonnet structure, a bonnet and a yoke, apertures formed entirely in one of the said latter members, the said bonnet having a curved wall projecting from an upper surface thereof for supporting the said yoke in end abutting relation thereon, clamp members between said bonnet and yoke members on at least one of said latter members including bolt means receivable within the said apertures and cooperating with the said clamp members to hold the bonnet and yoke together, each of the said bonnet and yoke members having annularly extending grooves on opposed ends thereof for receiving end portions of the said clamp members, each of the said grooves having a tapered annular surface to engage the said end portions of the clamp members whereby to draw the said yoke and bonnet members axially closer together upon tightening of said bolt means in cooperation with the said clamp members.

References Cited in the file of this patent

UNITED STATES PATENTS

| | | |
|---|---|---|
| 877,368 | Putney | Jan. 21, 1908 |
| 1,016,878 | Felkner | Feb. 6, 1912 |
| 1,190,350 | Williams | July 11, 1916 |
| 1,506,433 | Knauf | Apr. 26, 1924 |
| 2,280,094 | Madsen | Apr. 21, 1942 |